United States Patent [19]

McCabe

[11] Patent Number: 4,817,912

[45] Date of Patent: Apr. 4, 1989

[54] BI-METAL OPERATOR FOR SMOKE, FIRE AND AIR CONTROL DAMPER

[76] Inventor: Francis J. McCabe, 239 Hastings Ct., Doylestown, Pa. 18901

[21] Appl. No.: 100,601

[22] Filed: Sep. 24, 1987

[51] Int. Cl.[4] .......................... F16K 31/70; F24F 7/00

[52] U.S. Cl. .................................... 251/11; 16/485; 49/2; 98/1; 251/75; 256/49.2; 256/49.3

[58] Field of Search ..................... 16/48.5; 49/2; 98/1, 98/40.06, 42.15; 236/1 G, 49 A, 49 B, 101 R, 101 D; 251/11, 75

[56] References Cited

U.S. PATENT DOCUMENTS

| | | | |
|---|---|---|---|
| 1,919,625 | 7/1933 | Ewald | 98/1 |
| 3,378,199 | 4/1968 | Snell | 236/49.12 B |
| 3,889,314 | 6/1975 | McCabe | 49/2 |
| 3,967,779 | 7/1976 | Logsdon | 251/11 |
| 3,976,244 | 8/1976 | Logsdon | 251/11 |
| 4,074,388 | 2/1978 | McCabe | 49/2 |
| 4,113,232 | 9/1978 | McCabe | 251/305 |
| 4,290,554 | 9/1981 | Hensley | 236/49 B |
| 4,338,967 | 7/1982 | McCabe | 137/601 |
| 4,372,485 | 2/1983 | McCabe | 236/1 G |
| 4,390,123 | 6/1983 | McCabe | 236/1 G |
| 4,472,999 | 9/1984 | McCabe | 98/1 |
| 4,559,867 | 12/1985 | Van Becelaere et al. | 98/1 |

*Primary Examiner*—George L. Walton

*Attorney, Agent, or Firm*—Benasutti & Murray

[57] ABSTRACT

A damper operator for use with a damper having a frame and a damper blade pivotally associated with the frame, which damper operator comprises a bi-metallic element provided with a heating pad which may be remotely activated to control the damper. The bi-metallic element is linked to the blade by a linkage which includes an over center spring which applies force in both the fully opened and fully closed blade position. The bi-metallic element and over center spring arrangement acts to snap the damper blade into position thereby providing greatly reduced response times for a bi-metallic actuated damper. The damper blade operator may also include a knee action locking arrangement to maintain the damper blade in a selected position, particularly fully opened or fully closed, when the locking members assume an over center, substantially longitudinal alignment. The bi-metallic operator may include a mechanical linkage or stop to allow blade adjustment to regulate air flow through the damper.

17 Claims, 4 Drawing Sheets

FIG. 7
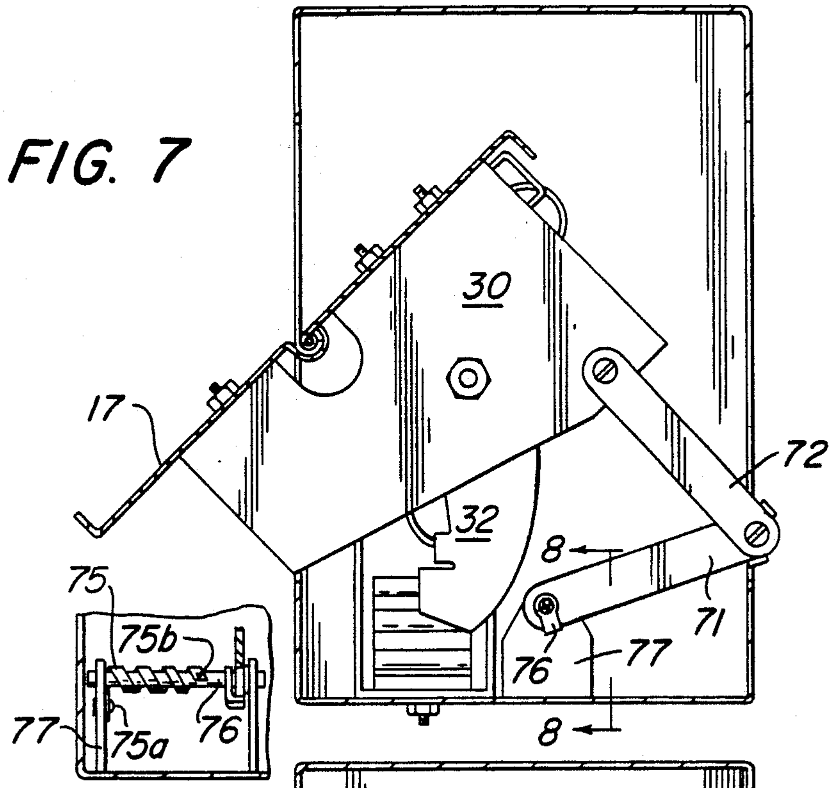
FIG. 8
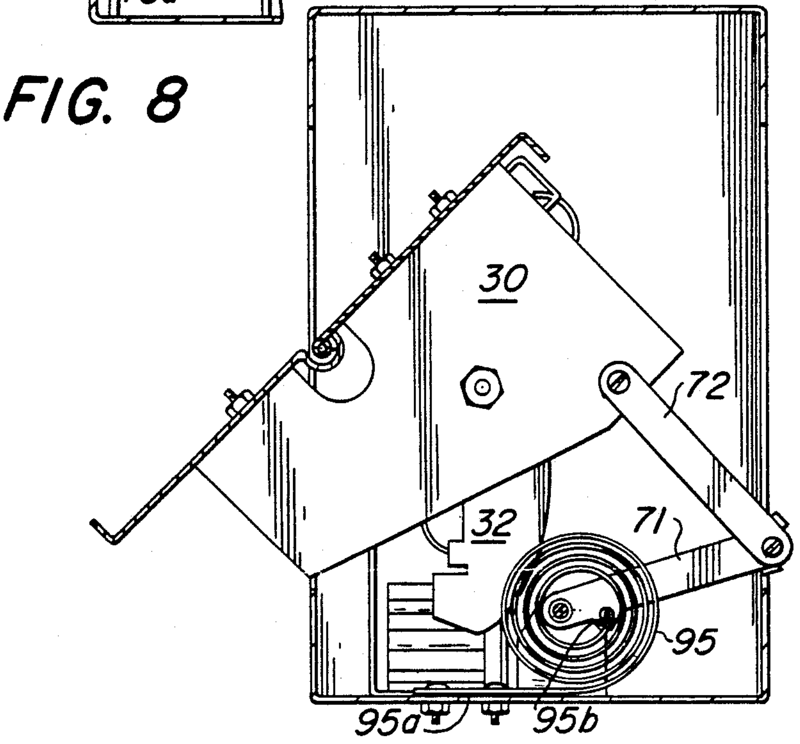
FIG. 9

BI-METAL OPERATOR FOR SMOKE, FIRE AND AIR CONTROL DAMPER

BACKGROUND OF THE INVENTION

The present invention relates generally to dampers and more particularly to thermally operated dampers for fire and smoke air flow control systems.

Conventionally, blade type dampers are employed to control the flow of air, smoke or fire through a diffuser or duct system during fire conditions. In a typical smoke control system, the damper blades of some dampers in the system are actuated to a fully opened position during fire conditions to allow smoke to be exhausted through specific ducts. The damper blades of other fire control dampers are displaced to their fully closed position during fire conditions to prevent the passage of smoke and fire through specific ducts.

Such prior art smoke or fire dampers are typically provided with means for remote control so that they may be selectively activated such as by a fire alarm system. Such smoke or fire dampers are placed at selected positions in a duct system, often in addition to the normal environmental air flow dampers.

The remote control of such fire and smoke dampers by electrical motors oriented outside the damper is common. Such motor activated dampers are relatively expensive to purchase and install. Also, the motors and wiring for such systems are difficult and expensive to install and maintain. Such control systems must be of first rate quality in order that reliable operation, often times years after installation in a dirty environment under extremely hostile conditions, can be expected.

Conventionally, such dampers in addition to means to activate the unit in response to remote signals also include means to respond to excessive temperature increases in the vicinity of the device. It has long been known that such dampers may be spring operated using cables attached to block or bracket linkages within the damper. The cables are normally threaded through a ferule disposed in the duct wall to reach an operator motor outside of the duct in which the damper is located. Springs are used t bias the blades towards a closed position, as for example, springs extending between the damper frame and the blade provided with a fusible link. The fusible link breaks in response to excessive temperature and allows the spring to move the blade or blades to a closed position whereupon the passage of fire through the duct system will be halted. The cable and operator motor allow reopening of the duct when desired. Similar arrangements have also been used to provide dampers which move to the fully opened position in response to selected stimulus and for air dampers wherein the blades are set to normally operate at an intermediate partially opened position.

Alternatively, it is known to operate dampers through a damper operator shaft the rotation of which corresponds to the rotation of the damper blades. See, for example, the structure and various damper operators disclosed and discussed in my prior issued U.S. Pat. No. 4,113,332 entitled "Smoke, Fire and Air Control Dampers with Stamped Blades".

The use of over center knee-action locking arrangements in either cable or shaft actuated dampers is disclosed in my prior issued U.S. Pat. No. 4,338,967 entitled "Universal Link Bar Operator and Actuator for Rotating Blade Air, Smoke and Fire Dampers" and the related applications disclosed therein which are incorporated herein by references as if fully disclosed herein.

The electric or pneumatic controls conventionally employed with such dampers are expensive to install and maintain. Further, such prior devices typically were limited to low temperature use, and were slow or unable to react to fire conditions or remote signals and did not automatically reset when the fire conditions were removed.

SUMMARY OF THE INVENTION

The present invention provides a relatively inexpensive damper for use in smoke and fire control systems which employs the movement of a bi-metallic element located within the damper frame responsive to localized temperatures to rotate the damper blade. The bi-metallic element is provided with a heating pad which may be remotely activated to control the damper. The element may be fitted with an adjustable holding means to allow air flow adjustment while retaining the safety mode wherein the damper reacts to fire conditions. The damper may thus be employed as a smoke/fire damper or as a ventilation damper which also acts as a smoke/-fire damper. The bi-metallic element is linked to the blade by a link-age which includes an over center spring having a low spring gradient which applies force in both the fully opened and fully closed blade position. The bi-metallic element is thus relied upon to move the linkage to a point on either side of center for the linkage whereupon the over center spring acts to snap the damper blade into position. The use of such an operator greatly reduces the response time of the bi-metallic actuated smoke or fire damper. A spring with a lower force may be employed in combination with the present design to provide a temperature compatible servo to augment the full open to full closed action of an air flow controller.

By providing the bi-metallic element with an electrical resistance heating pad, remote control is provided by relatively simple wiring which is necessary only for remote operation of the damper. Response times for remote activation of from 1 to 1½ minutes have been achieved. Automatic response times for fire conditions of less than one minute have been achieved. When the damper is provided with a lower force spring to act as an air flow controller, the heating pad allows the actuator to function as an air or temperature controller which responds to signals from a variable voltage control or thermostat. The lower force spring allows for flow modulating operation while retaining a full open full closed biasing action.

The use of a bi-metallic element with an over-center spring assist provides a fire or smoke damper which will automatically reset after the temperatures of a fire condition pass. The present invention provides a fire control damper which can be designed to automatically snap closed between 200° and 300° F. and can remain operable when exposed to temperatures as high as 1500° F. Upon cooling, the damper will automatically open at a temperature below between 100° and 200° F. Upon opening, after a fire or in response to a control signal, the damper will allow a smoke purging function to be carried out. The actual temperature at which the operator reacts can be adjusted by selection of an appropriate bi-metallic element or altering the tension, geometric shape or positioning of the bi-metallic element.

It is an object of the present invention to provide a fire or smoke damper which will automatically move to a fully open or fully closed position from an at rest position in less than about 1.5 minutes.

It is a further object of the present invention to provide a fire or smoke damper which employs a bi-metallic element which may be remotely controlled to move the blade to a fully closed or fully opened position in less than about 1.5 minutes.

It is a further object of the present invention to provide a bi-metallic operator for a fire or smoke damper which includes a biasing spring to decrease the response time of the damper in both opening and closing motions.

It is a further object of the present invention to provide a fire or smoke damper which will automatically reset after exposure to temperatures or control signals which cause the damper to assume its "safety mode".

It is a further object of the present invention to provide a bi-metallic operator for a smoke or fire damper which includes a remotely controlled heating pad to activate the operator.

It is a further object of the present invention to provide a remotely controlled bi-metallic operator for a fire or smoke damper which includes a heat sensing switch to decrease voltage to the bi-metallic element heating pad when a specified heating pad temperature is reached to increase the life of the heating pad while lowering energy requirements.

It is a further object of the present invention to provide a fast acting fire or smoke damper which includes knee-action locking members to maintain the damper blades in a selected position particularly fully opened or fully closed, when the locking members assume an "over center" position in which they are in substantial longitudinal a alignment.

It is a further object of the present invention to provide a temperature control damper which will open o close in response to signals from a thermostat to modulate air flow.

DETAILED DESCRIPTION OF THE DRAWINGS

FIG. 7 is a cross sectional view of an alternate embodiment of the present invention.

FIG. 8 is a cross sectional view along line 8—8 of FIG. 7.

FIG. 9 is a cross sectional view of a alternate embodiment of the present invention.

DETAILED DESCRIPTION OF THE PREFERRED EMBODIMENT

Although specific forms of the invention have been selected for illustration, and the following description is drawn in specific terms for the purpose of describing these forms of the invention, this description is not intended to limit the scope of the invention which is defined in the appended claims.

Figures 1, 4:
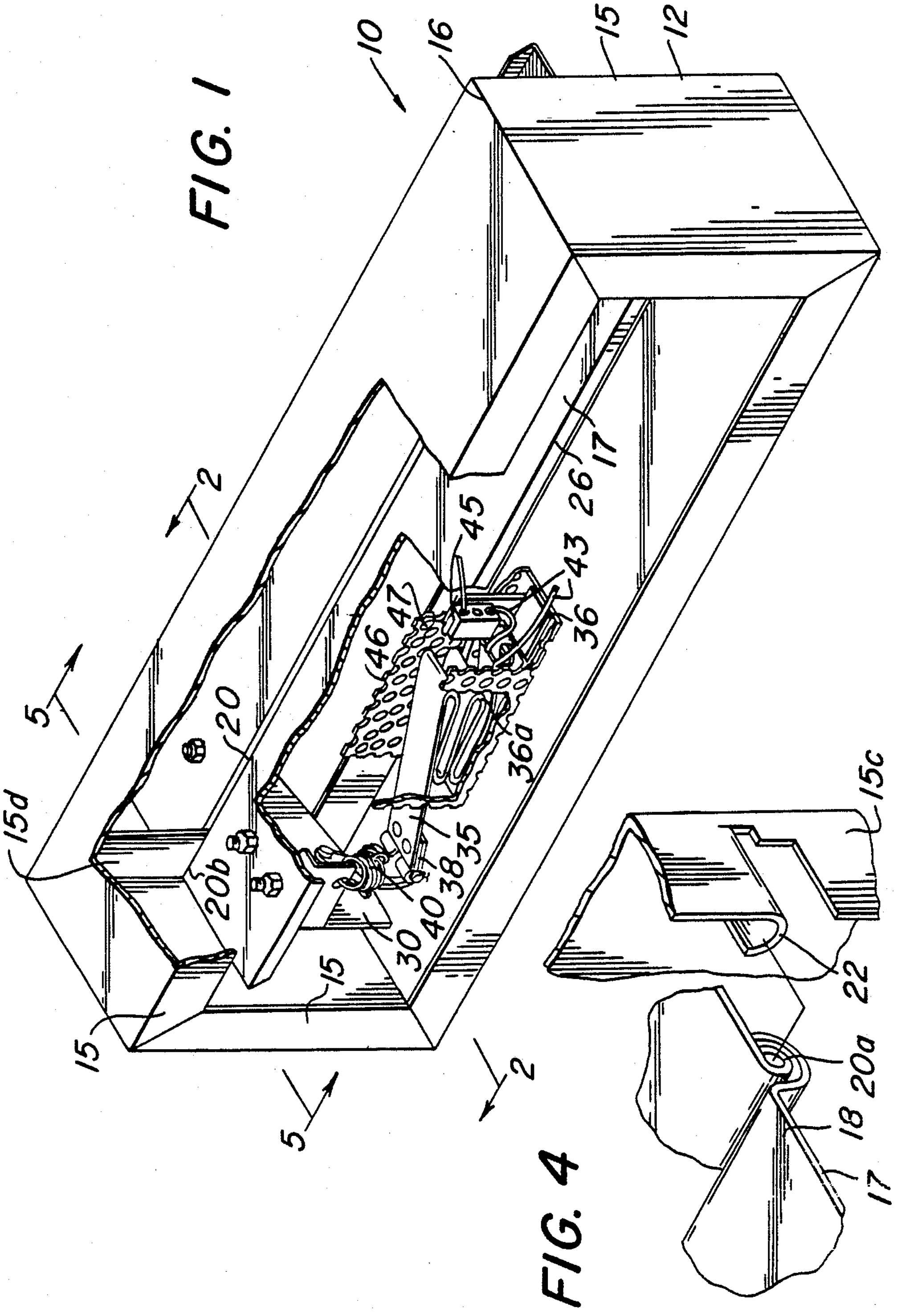
FIG. 1 is a perspective view of a rectangular single blade damper showing the operator of the present invention, portions of which have been broken away to show internal construction details.
FIG. 4 is a partial cross sectional view of the hinge of the present invention.

Referring now to the drawings, FIG. 1 shows a preferred embodiment single blade, rectangular damper 10. The damper 10 has a frame 12 which includes an exterior walls 14 and flanges 15 which depend inwardly from exterior wall 14. Typically, the frame 12 is formed from a single section of sheet stock which is punched and roll formed The frame 12 is joined at a seam 16 which is closed by crimping, riveting, welding or other suitable means. It is, of course, not necessary for the damper frame 12 to be rectangular in cross section, it being clearly understood that similar damper frames can be formed to fit within any number of duct shapes such as those having circular or square cross sections.

Pivotally attached within the damper frame 12 is a damper blade 17 which includes a substantially planar surface 18 having dimensions slightly less than that of frame 12. The damper blade 17 includes a hinge 20 substantially centrally disposed along the surface 18 of the damper blade 17. Each end **20*a* and 20*b* of the hinge 20 is pivotally mounted on the damper frame 12. Such pivotal engagement is accomplished by providing flange sections 15*c* and 15*d* with hook shaped protrusions 22, which correspond to ends 20*a* and 20*b* of hinge 20**.

The hinge 20 of the damper blade 17 fits over hook shaped protrusions 22 and is then capable of rotation within damper 10 from an opened to a closed position. The damper blade 17 includes ribs 26 and 28 formed on the distal ends thereof to stiffen the damper blade.

Affixed to damper blade 17 and extending substantially perpendicularly therefrom is bracket 30. Bracket 30 is affixed to blade 17 by welding, riveting or other suitable means. The bracket 30 extends from blade 17 such that when blade 17 is in a closed position, FIG. 3, the bracket 30 is oriented within the damper frame 12.

Extending from bracket 30 is a pivot arm 32. Pivot arm 32 is fixed to bracket 30 in a pivotal interconnection 34 at a first end **32*a*. The second end 32*b* of pivot arm 32 is pivotally interconnected with a bi-metallic element 35. Also extending between bracket 30 and bi-metallic element 35 is a spring 40** described more fully herein below.

Bi-metallic element 35 is formed in a serpentine shape which includes a base section 36 adapted to be fixed to frame 12 by riveting, bolting or other suitable means. It is preferred that the bends **36*a* have as small a radius as is possible, to maximize the spring action. A series of bends 36*a* are formed in bi-metallic 35 terminating in a end 38 adapted to pivotally interconnect with pivot arm 32**.

The bi-metallic element 35 is provided with an electrical resistance heating pad 42. The heating pad 42 is preferably oriented on the high expansion side of the bi-metallic element 35. The heating pad 42 is supplied power through wires 43 and a suitable control circuit, not shown. The control circuit for heating pad 42 preferably includes means to decrease the voltage supplied to heating pad 42 when a predetermined position is reached by bi-metallic element 35. A position switch 45 is mounted to damper frame 12 to reduce the voltage to heating pad 42. The switch 45 reduces the voltage to heating pad 42 when activated. This allows the bi-metallic element 35 to be activated by a relatively high voltage and then held in a predetermined position by a reduced voltage which conserves electricity and also extends the life of the heating pad 42.

The bi-metallic element 35 is preferably partially enclosed by a shield 46. Shield 46 helps to decrease the response time of the bi-metallic element 35 when a voltage is supplied to heating pad 42 by controlling convection heat losses. However, shield 46 preferably includes perforations 47 to allow the circulation of air within the duct around bi-metallic element 35.

The spring 40 is fixed at a first end 40*a* to a point 31 adjacent the pivotal interconnection of bi-metallic element 35 and pivot arm 32. The second end 40*b* of the spring 40 is fixed to bracket 33 extending from bracket 30. Spring 40 is preferably a coil spring, although other biasing means having the desired properties may be employed. Spring 40 preferably has a low spring gradient such as provided by a coil spring having a large number of turns and having a diameter which is relatively large with respect to the length of the spring.

Figure 2:
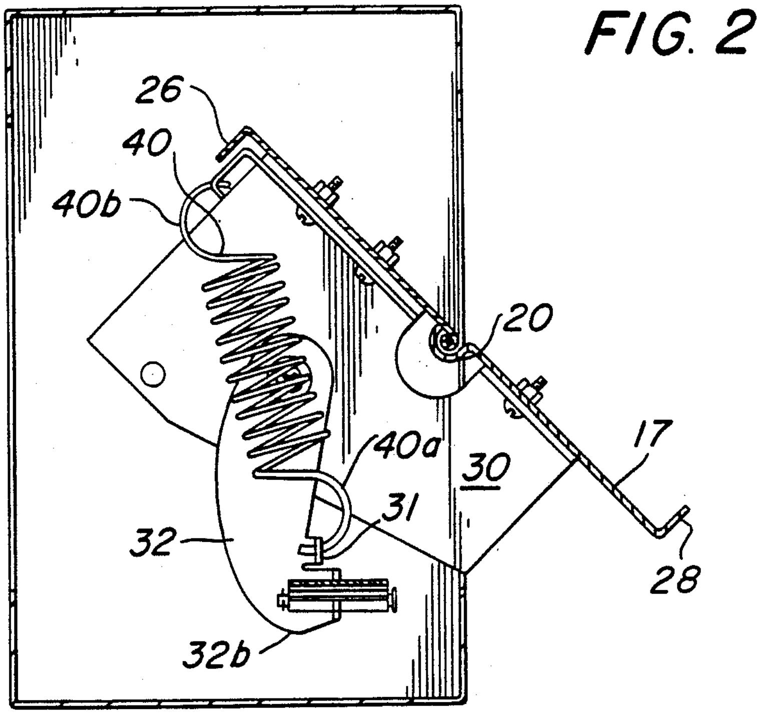
FIG. 2 is a cross sectional view along line 2—2 of FIG. 1 showing the damper blade in a half closed position.

Spring 40 provides an over center action with respect to the linkage between bi-metallic element 35, bracket 30 and pivot arm 32. The attachment point of spring 40 to bracket 30 is such that spring 40 biases the damper blade 17 to both a fully opened and a fully closed position. As shown in FIG. 1, spring 40 biases the damper blade 17 to a fully opened position. As bi-metallic element 35 expands in response to a temperature increase, the damper blade 17 is pivoted against the force of the spring 40 to a "center" position, FIG. 2. In the "center" position, the interconnection of bracket 30 and pivot arm 32 is directly in line with the biasing force of spring 40. As the blade is pivoted further past this center position, spring 40 acts to snap the damper blade 17 to a fully closed position, FIG. 3.

Figure 3:
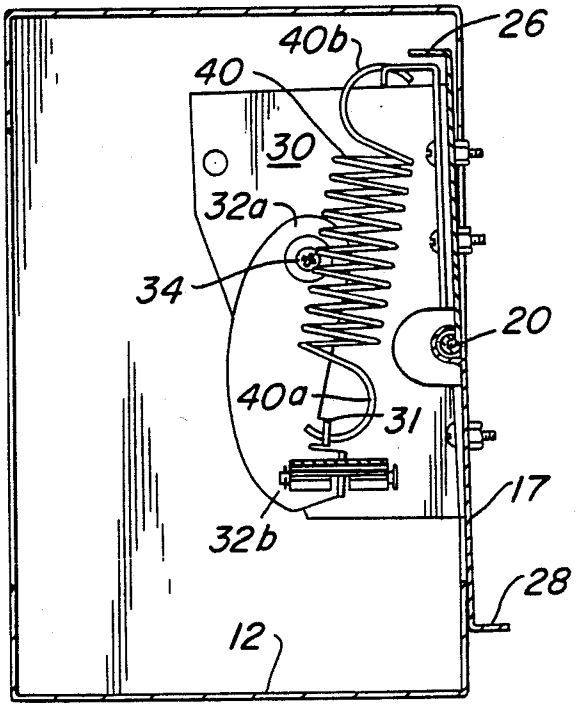
FIG. 3 is a cross section along line 2—2 of FIG. 1 showing the damper blade in a fully closed position.
Figure 5:
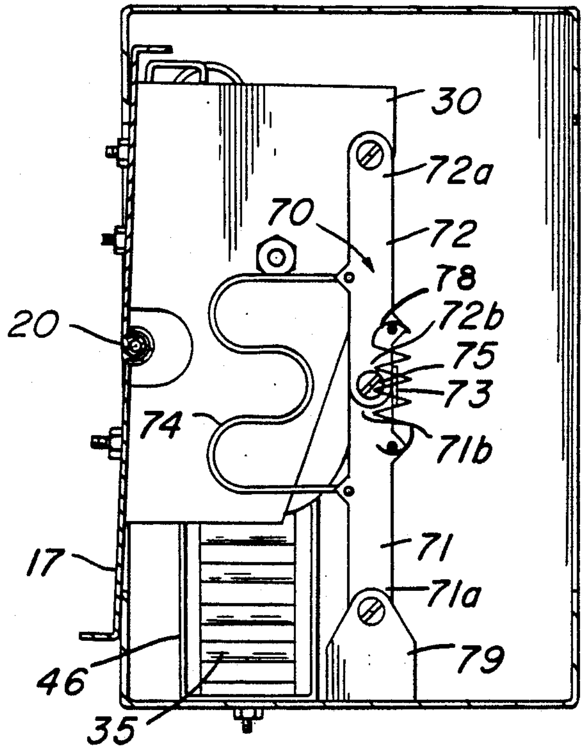
FIG. 5 is a cross section along line 5—5 of FIG. 1 of an alternate embodiment showing the damper fully closed.

This over center action of spring 40 greatly reduces the response time of damper blade 17 in moving from a fully opened to a fully closed position. Conversely, when in a fully closed position as shown in FIG. 3, as bi-metallic element 35 cools, the damper blade 17 is pivoted against the force of the spring 40 to the "center" position, FIG. 2. As the bi-metallic element 35 cools further, spring 40 is moved past center and snaps the blade to the fully open position, FIG. 1.

With a six radius bi-metallic element 40 and the described over center spring arrangement, response times to electrical heating by pad 42 of less than 1.5 minutes are possible. Automatic response times to fire conditions, heat over about 350° F., in the damper of less than one minute are possible. When the electric power to heating pad 42 is removed or the heat of fire conditions is removed, the damper blade 17 automatically returns to the fully opened position in less than about 3 minutes depending upon air flow in the duct. These relatively short response times are possible due to the use of the over center spring action to snap the damper blade into the fully opened or the fully closed positions when the bi-metallic element pivots the damper blade 17 to just passed the "center" position. The cycle time for the damper can be varied by altering spring positioning and tensioning.

In an alternate embodiment as shown in FIGS. 5 through 9, the damper 10 is provided with a locking means to hold the damper blade in the fully closed position even against the high pressures of heat and smoke encountered during fire conditions.

Figure 6:
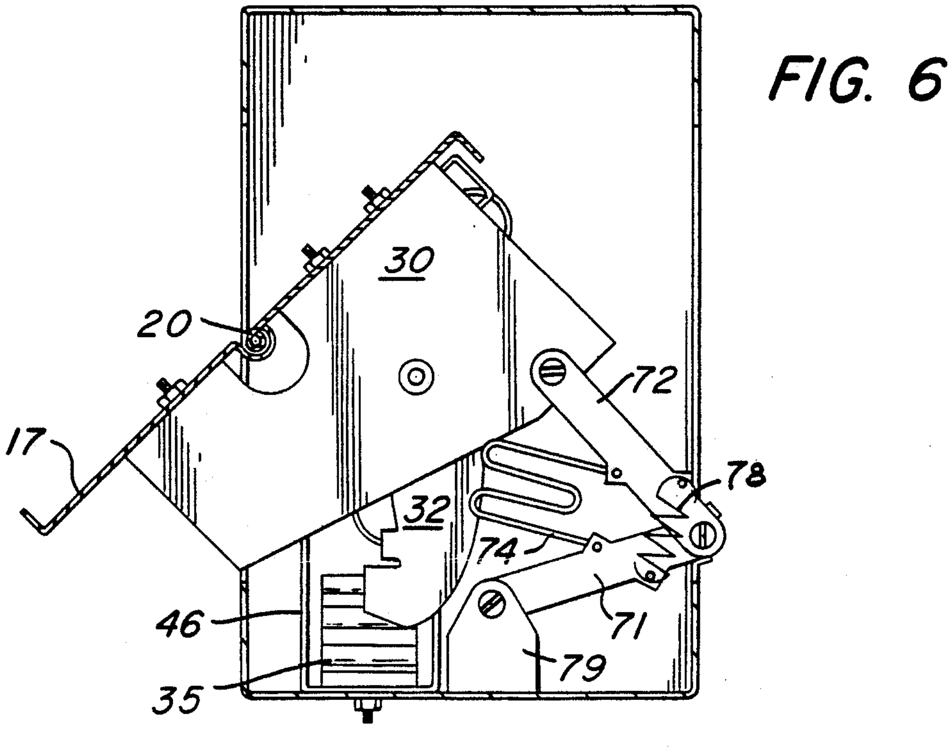
FIG. 6 is a side view of the alternate embodiment of FIG. 5 showing the damper in a half open position.

A knee action lock 70 may be provided to releasably lock the blade 17 in the closed position to resist the extreme heat and pressure which can accompany fire conditions. Knee action lock 70 includes a first link 71 pivotally fixed at a first end 71*a* to frame bracket 79. The second end 71*b* of first link 71 is pivotally connected to a first end 72*b* of second link 72. The second end 72*a* of second link 72 is pivotally fixed to bracket 30. The pivotal connection between ends 71*b* and 72*b* includes a stop means 73. The first 71 and second 72 links are sized so that as blade 17 moves to a closed position, links 71 and 72 align, in a knee action, to a substantially linear arrangement, FIG. 5, thereby holding the blade in a closed position. An over center spring 78 extends between link 71 and 72 to bias the knee action lock to both the closed position (FIG. 5) and the open position (FIG. 6). Stop means 73 holds the links 71 and 72 in this substantially linear orientation. A second bi-metallic element 74 extends between first link 71 and second link 72 across pivotal connection 75. Second bi-metallic element 74 releases the knee action locking of links 71 and 72 upon cooling to allow blade 17 to automatically return to the open position, FIG. 6.

Alternate shapes for bi-metallic element 74 include a helical shape as shown in FIGS. 7 and 8. Helical bi-metallic element 75 is fixed to frame 12 at a first end 75*a* by a support bracket 77 and includes a drive rod 76 at a second end 75*b*. FIG. 9 shows another alternate shape for bi-metallic element 74. As shown in FIG. 9, a spiral bi-metallic element 95 may be employed. Spiral bi-metallic element 95 is fixed at a first end 95*a* to frame 12 and is fixed at a second end 95*b* to arm 71. Alternatively spiral bi-metallic element may be oriented at the interconnection of arms 71 and 72 (not shown). The helical and spiral bi-metallic arrangements shown in FIGS. 7–9 may also be adapted to replace bi-metallic element 35.

The damper operator of the present invention provides a fast-acting automatically resetting fire and smoke damper. The operator of the present invention is oriented completely within the damper frame to minimize the possibility of damage to the operator during transportation and installation. The damper operator of the present invention does not use motors to operate thereby avoiding the hazards caused by sparking.

Although the foregoing serves well to satisfy the objectives previously set forth, it will be understood that the damper operator previously described may be modified in order to meet a variety of operational conditions. For example, the size of the operator used can be altered as needed. So too can the number of bends which form the bi-metallic element. Various other linkages may be developed to achieve the desired over center spring action.

It will therefore be understood that various changes in the details, materials and arrangement of the parts which have been herein described and illustrated in order to explain the nature of this invention, may be made by those skilled in the art within the principle and scope of the invention as expressed in the following claims.

What is claimed is:

1. An improved damper operator for a damper having a frame and a reciprocal blade operatively associated with the frame, comprising:

(a) a bi-metallic element, a first end of which is fixedly connected to the frame;

(b) a pivotal linkage including a pivot point, said pivotal linkage being pivotally connected to a second end of said bi-metallic element and operatively connected to the blade;

(c) a single over center action biasing means operatively coupled from said bi-metallic element to said blade; and (d) a center position being defined at a location where said pivot point is directly in line with a biasing force of said biasing means as said bimetallic element is heated, said biasing means moves in one direction to one side of said center position to snap said blade to a fully close position and as said bimetallic element is cooled said biasing means moves in an opposite direction to the other side of said center position to snap said blade to a fully open position.

2. The improved damper operator of claim 1, wherein said biasing means comprises a coil spring.

3. The improved damper operator of claim 1 further including heating means on said bi-metallic element to selectively heat said bi-metallic element to operate said damper.

4. The improved damper operator of claim 3, wherein said heating means comprises an electrical heating element.

5. The improved damper operator of claim 4, wherein said heating element is affixed to a high expansion side of said bi-metallic element.

6. The improved damper operator of claim 1, wherein said bi-metallic element is oriented within said frame partially surrounded by a shield.

7. The improved damper operator of claim 6, wherein said shield is perforated.

8. The improved damper operator of claim 1, further including a stop means to releasably lock said blade in a closed position, wherein said stop means comprises:

(a) a first link operatively connected at a first end to a second bi-metallic element and at a second end to a second link;

(b) said second link connected at a first end to said first link and operatively connected at a second end to said blade;

(c) stop means for limiting articulation between said links when said links align substantially linearly in an over center position, whereby said links in said over center position lock said blade in position relative to said frame.

9. The improved damper operator of claim 1, wherein response time for said operator is less than about 1.5 minutes.

10. The improved operator of claim 1, wherein the bi-metallic element is a serpentine spring having a plurality of bends.

11. An improved damper operator having a frame and a reciprocal blade operatively associated with the frame, comprising:

(a) a bi-metallic element, a first end of which is fixedly connected to said frame;

(b) a pivotal linkage including a pivot point, said pivotal linkage being pivotally connected to a second end of said bi-metallic element and operatively connected to said blade;

(c) a single over center action biasing means operatively coupled from said bi-metallic element to said blade;

(d) stop means to releasably lock said blade in a fully closed position; and (e) a center position being defined at a location where said pivot point is directly in line with a biasing force of said biasing means as said bimetallic element is heated, said biasing means moves in one direction to one side of said center position to snap said blade to a fully close position and as said bimetallic element is cooled said biasing moves in an opposite direction to the other side of said center position to snap said blade to a fully open position.

12. The improved damper operator of claim 11 further including heating means on said bi-metallic element to selectively heat said bi-metallic element to operate said damper.

13. The improved damper operator of claim 11, wherein said stop means comprises:

(a) a first link operatively connected at a first end to said frame element and at a second end to a second link;

(b) said second link connected at a first end of said first link and operatively connected at a second end to said blade;

(c) stop means for limiting articulation between said links when said links align substantially linearly in an over center position, whereby said links in said over center position lock said blade in position relative to said frame.

14. The improved damper operator of claim 13, further including a second bi-metallic element extending from said first link to said second link to release said links from said over center position upon cooling.

15. The improved damper operator of claim 11, wherein said bi-metallic element is oriented within said frame partially surrounded by a shield.

16. The improved damper operator of claim 15, wherein said shield is perforated.

17. The improved operator of claim 11, wherein the bi-metallic element is a serpentine spring having a plurality of bends.

* * * * *